Feb. 8, 1938.　　S. D. BUTTERWORTH ET AL　　2,107,932
CAR LOADING DEVICE
Filed Sept. 10, 1934
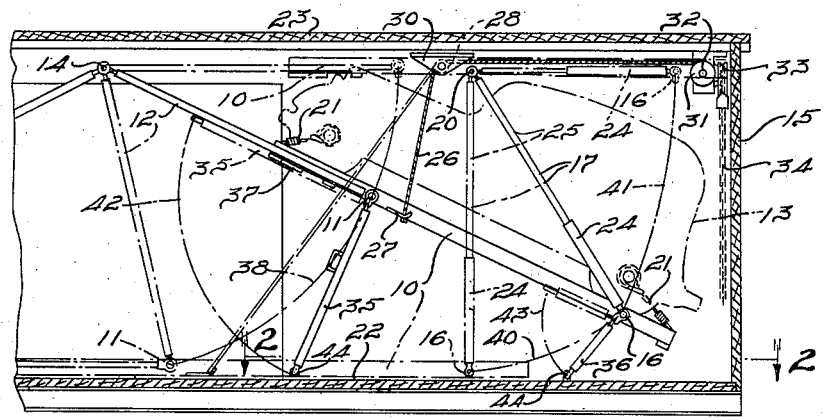
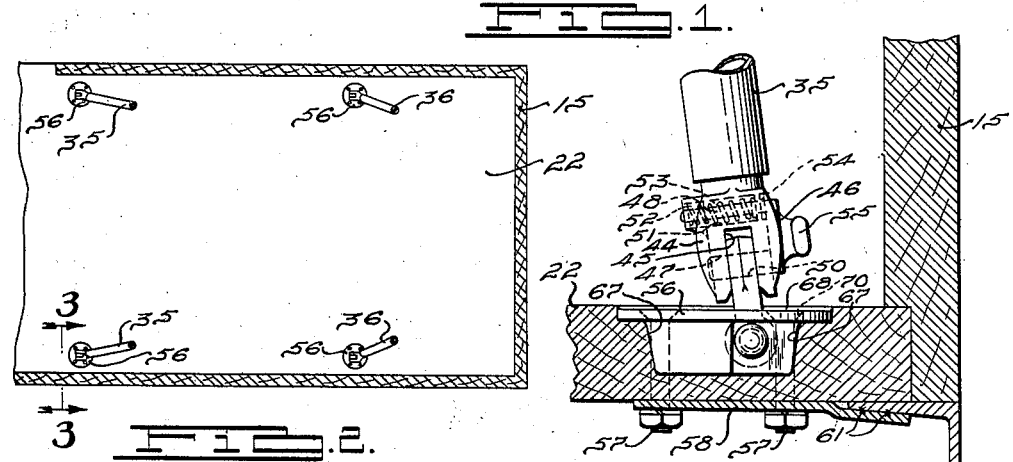
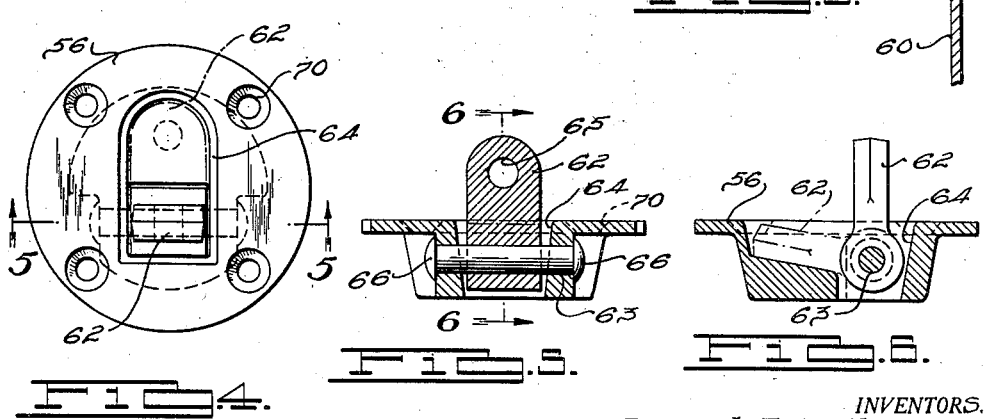
INVENTORS.
Samuel D. Butterworth,
Sulo M. Nampa.
BY
Harness, Dickey Pierce & Hann.
ATTORNEYS.

Patented Feb. 8, 1938

2,107,932

UNITED STATES PATENT OFFICE 2,107,932

CAR LOADING DEVICE

Samuel D. Butterworth and Sulo Michael Nampa, Detroit, Mich., assignors of ninety-nine percent to The Worth Company, a corporation of Michigan; and one percent to said Samuel D. Butterworth Application September 10, 1934, Serial No. 743,372

4 Claims. (Cl. 105—368)

This invention relates to car loading devices and more especially to mechanism for disposing an automobile in a semi-decking position for transportation purposes.

In certain respects the invention relates to a co-pending application of Samuel D. Butterworth, for Car loading device, Serial No. 646,830, filed December 12, 1932, and assigned to the same assignee as is the present application.

The principal object of the present invention is to provide mechanism for readily connecting and disconnecting certain parts of a car loading device to and from permanent parts of the car.

Another object is to provide a novel combination of floor pocket and clevis and pin assemblies for connecting parts of a car loading device to the car.

A further object is to provide strong and rigid connecting means for securing a car loading device in a decking position so that an automobile may be safely supported by the device during transportation.

It is also an object of this invention to reduce the time required for loading and unloading automobiles in and from a freight car and for preparing the car for receiving a return load of a different character.

Another object of the invention is to provide a novel floor pocket assembly adapted to fold substantially to the floor level when not in use and to facilitate the connection of the car loading device with the steel framing of the car when the car loading device is in use.

Other objects, features and advantages will become apparent from the following description and appended claims.

For the purpose of illustrating the genus of the invention, a typical concrete embodiment is shown in the accompanying drawing, in which:

Figure 1 is a fragmentary, vertical, longitudinal section of a portion of a freight car and illustrates the arrangement therein of a car loading device constructed substantially according to the preferred form of this invention;

Fig. 2 is a section taken substantially on the line 2—2 of Fig. 1;

Fig. 3 is an enlarged section taken substantially on the line 3—3 of Fig. 2;

Fig. 4 is a top plan of parts shown in Fig. 3;

Fig. 5 is a section taken substantially on the line 5—5 of Fig. 4; and

Fig. 6 is a section taken substantially on the line 6—6 of Fig. 5.

Referring to the drawing and more particularly to Figs. 1 and 2 thereof, there is shown a decking frame 10 which is pivotally connected at its forward end, as indicated at 11, to the lower ends of a pair of suspension rods 12 disposed on opposite sides of the decking frame with these rods extending upwardly and having their upper ends pivotally connected, as indicated at 14, to metal parts of the frame of a freight car, indicated generally at 15. The rear portion of the frame is pivotally connected at opposite sides, as indicated at 16, to another pair of oppositely disposed suspension rods 17 which have their upper ends pivoted, as indicated at 20, also to metal parts of the car frame. But one of the rods 12 and 17 of each of the pairs of suspension rods are shown in Fig. 1, but it will be understood that similar rods are correspondingly disposed upon the opposite side of the frame 10. The suspension rods 12 and 17 are preferably tubular in form.

A decked automobile, outlined in dot-and-dash lines at 13, may be secured by suitable fastening means 21 to opposite ends of the frame 10. As shown in Fig. 1 in full line, the frame 10 is in semi-decking position and as shown in dot-and-dash lines this frame may assume a position adjacent and parallel to the freight car floor 22, or may assume a similar position with respect to the car roof 23. The frame 10 in the position on or adjacent the floor 22 is adapted to have the automobile 13 rolled on or off the frame, and when the frame 10 is in the position adjacent the roof 23, it is parallel close to the roof of the freight car 15 so that the latter may be used for the transportation of a load, such as a return load, of a different character from automobiles. As shown by Fig. 1, when the frame 10 is in the floor position, the front pair of suspension rods 12 are inclined forwardly with respect to a vertical plane, while the rear suspension rods 17 are disposed substantially in a vertical plane.

Each of the suspension rods 17 is of telescopic character and includes a lower tubular portion 24 which is large enough to receive a smaller upper tubular portion 25 having its inner or lower end enlarged or provided with stop means to engage a shoulder or other stop means at the upper end of the lower tubular portion to limit the amount by which the telescopic portions of the rods 17 may be extended relative to one another. Cables 26 may be provided at each side of the frame 10 for raising the frame and causing the suspension rods 12 and 17 to pivot about their upper pivotal connections 14 and 20 to move the frame 10 longitudinally of the freight car 15 from the floor position to the full line or semi-decking position and to the roof position. The cables 26 are attached to the frame 10 adjacent the pivots 11 upon opposite sides of the frame by brackets such as indicated at 27. The cables 26 extend upwardly and are trained over pulleys 28 mounted in brackets 30 preferably attached to the metal framing of the roof structure of the freight car 15. The cables then extend substantially parallel to the roof to a point adjacent the end wall of a freight car where they are trained over drums 31 mounted on a rotary shaft 32. This shaft may be operated through a suitable worm wheel and worm gear or other desired driving means operable by means of a sprocket wheel 33 upon which a chain 34 is trained. The chain 34 extends downwardly along the end wall of the freight car to a point where it is convenient for manually manipulating to elevate the frame 10 from its lowered on floor position to the semi-decking and roof positions. The frame, together with an automobile thereon, due to the gear or other desired reduction driving means interposed between the sprocket wheel 33 and the drum 31 may be raised by manual manipulation of the chain 34 without excessive effort. When the frame 10 is in the floor position, due to the inclination of the forward suspension rods 12 and to the substantially vertical disposition of the suspension rods 17, all of the suspension rods will pivot about their upper pivotal connections 14 and 20 as the frame is elevated from the floor position and the frame will assume a semi-decking position inclined to the vertical and shown in full lines in Fig. 1. When the frame is in this position and automobile 13 fastened thereon, it is preferred to use under-supporting members 35 and 36 pivoted to each side of the frame 10 and which may be releasably connected to the metal framing normally provided beneath the floor 22 of the freight car 15 whereby to provide a very rigid mounting for the frame 10 and load carried thereby during transportation.

To effect the automatic positioning of the decking frame 10 adjacent the roof 23 of the freight car 15 and substantially parallel thereto, outwardly projecting members 37 are provided at the forward end of the frame and on opposite sides thereof, which members are adapted to engage the under faces of the suspension bars 12 when the frame 10 reaches semi-decking position or slightly thereafter so that the frame 10 cannot rotate beyond a straight line position about the pivot 11 in a clockwise direction with respect to the suspension rods 12 while the frame is being moved from semi-decking to roof position. The suspension rods 17 will not interfere with this movement from semi-decking to roof position due to the telescopic character thereof, the rods 17 becoming shorter in effect as the frame is raised from semi-decking to roof position, and in the latter position the rods 17 will lie substantially parallel and along the sides of the frame 10.

When the frame 10 is not loaded with an automobile it may be moved from floor position to roof position by manipulating the chain 34 to tension the cables 26, the lower pivoted ends 11 of the suspension rods 12 swinging through arcs indicated at 38 during this operation. The lower pivoted ends 16 of the suspension rods 17 move through the arcs 40 and 41 during the elevation of the decking frame from the floor position to the roof position. When the frame 10 reaches the semi-decking position, or slightly thereafter, the outwardly projecting members 37 engage the undersides of the suspension rods 12 and remain in contact therewith as the frame is elevated to roof position. The under support members 35 and 36 are pivotally connected to the lower ends of the suspension rods 12 and 17 and when the lower ends of the under supporting members are detached from the car they are adapted to be swung through the arcs 42 and 43, respectively, to positions substantially parallel with the frame 10. The under supporting members may be fastened to the frame 10 by any suitable means and remain parallel thereto while the frame is elevated to the roof position.

Reference may now be had to Figs. 3 to 6, inclusive, which illustrate more in detail a clevis and pin and floor pocket assembly by which the lower ends of the under supporting members 35 and 36 are detachably connected to the metal framing of the car 15. Referring more particularly to Fig. 3, the clevis and pin assembly preferably comprises a clevis forging 44 having the upper end thereof disposed within the lower end of an under supporting member 35 or 36 and secured therein, as by means of welding. The lower ends of the clevises 44 are each bifurcated to provide a slot 45 for the reception of a link of a floor pocket assembly, later to be described. A substantially U-shaped clevis pin unit 46 has the legs 47 and 48 thereof disposed within suitable transverse bores 50 and 51 extending through the clevis forging 44. A spring retaining washer 52 is secured to the outer end of the leg 48 of the clevis pin unit 46 to retain a spring 53 between the washer and a shoulder 54 provided at one end of the bore 51. The leg 47 constitutes the clevis pin proper and extends transversely of the clevis forging 44 and of the slot 45 therein and is spaced a substantial distance from the bottom of said slot. A grip piece 55 is formed on the bar portion of the clevis pin assembly 46 for the purpose of aiding in manually drawing the clevis pin unit outwardly of the clevis forging 44 and to the right as viewed in Fig. 3 so as to withdraw the clevis pin 47 to a position so that it no longer traverses the slot 45.

The floor pocket assembly comprises a floor pocket forging 56 secured, as by means of bolts 57, to a securing plate 58 fixed, as by welding, to the metal framing of the car 15. The side sills 60 of the frame of the freight car 15 afford convenient portions of the frame of the freight car to which the securing plate may be welded as indicated at 61. A link forging or tongue 62 may be pivotally connected to the floor pocket forging 56 by means of a pin 63 so that the link or tongue 62 may fold within a recess 64 as indicated in dot and dash line in Figs. 4 and 6, and in this position does not materially disrupt the surface of the floor 22. The link or tongue 62 may be swung to a position as indicated in full line in Figs. 3, 5 and 6 so that the clevis pin leg 47 may engage an opening 65 within the link 62 to detachably connect an under-supporting member 35 or 36 to the metal framing of the car 15. The cables 26 may be tensioned to assume the weight of the decking frame and any load carried thereby when the members 35 and 36 are to be connected or disconnected from the car to prevent binding between the pins 47 and the links 62. The ends of the pin 63 may be headed as indicated at 66 to permanently retain the link 62 in assembled relation with respect to the floor pocket forging 56. A suitable recess 67 may be cut in the flooring 22 to receive the floor pocket forging 56 so that the upper surface thereof will be disposed substantially flush or preferably slightly below the upper surface of the flooring 22 so that it will not be materially above the floor surface after the floor becomes worn. The bolts 57 are provided with flat machine screw heads 68 adapted to be disposed in suitable counter-sunk recesses 79 so that they will lie flush with the upper surface of the floor pocket forging.

As indicated in Fig. 2, each of the under-supporting members 35 and 36 provided with a clevis and pin assembly cooperable with a floor pocket assembly, as above described, which mechanism permits all the under-supporting members of the decking frame to be readily and quickly connected and disconnected to and from the freight car, thus cutting down the time required for loading and unloading automobiles in and from the freight car. The clevis and pin and floor pocket assemblies rigidly secure the decking frame in position so that the automobiles loaded in the freight car will not be damaged during transportation. Because of the connection of the floor pocket assemblies rigidly to the metal framing of the freight car at points below the floor 22, the flooring is not subjected to strain and damage incident to forces exerted by the decking frame during transportation.

As many changes could be made in the above construction and many apparently widely different embodiments of this invention could be had without departing from the scope thereof, it is intended that all matter contained in the above description or shown in the accompanying drawing shall be interpreted as illustrative and not in a limiting sense.

What is claimed is:

1. An article of manufacture designed to be used in a freight car floor for anchoring objects, comprising a metal pocket having a base and a side wall around the base, and an attachment member pivoted within the pocket for pivotal movement into and out of the pocket, said member substantially corresponding in shape to the exposed opening in the pocket so as to substantially close said opening when pivotally moved into the pocket.

2. An article of manufacture designed to be used in a freight car and to be inserted in an opening in the floor thereof, comprising a metal pocket having a side wall and a base tapering to one side of the pocket and provided with an opening in such base at the lower end of the taper, and an attachment member pivoted in the pocket for pivotal movement into and out of the pocket.

3. An article of manufacture designed to be used in a freight car and to be inserted in an opening in the floor thereof, comprising a metal pocket having a side wall and a base tapering to one side of the pocket and provided with an opening in such base at the lower end of the taper, and an attachment member pivoted in the pocket for pivotal movement into and out of the pocket, said member substantially corresponding in shape to the exposed opening on the pocket so as to substantially close said opening when pivotally moved into the pocket.

4. An article of manufacture designed to be used in a freight car floor for anchoring objects, comprising a metal pocket having a base and a side wall portion, said side wall portion having its outer surface generally tapered outwardly and upwardly away from the base, and an attachment member pivoted within the pocket and pivotal into and out of the latter, said member substantially corresponding in shape to the exposed pocket opening so as to substantially close said opening when pivotally moved into the pocket.

SAMUEL D. BUTTERWORTH.
SULO MICHAEL NAMPA.